United States Patent [19]

Jensen et al.

[11] Patent Number: 5,322,703
[45] Date of Patent: Jun. 21, 1994

[54] HIGH-YIELD ROASTED COFFEE WITH BALANCED FLAVOR

[75] Inventors: Mary R. Jensen; Steven J. Kirkpatrick; Jeffrey K. Leppla, all of Cincinnati, Ohio

[73] Assignee: The Procter & Gamble Company, Cincinnati, Ohio

[21] Appl. No.: 162,818

[22] Filed: Dec. 6, 1993

Related U.S. Application Data

[63] Continuation of Ser. No. 943,079, Sep. 10, 1992, abandoned.

[51] Int. Cl.⁵ .................................. A23F 5/04
[52] U.S. Cl. ..................... 426/595; 426/388; 426/466
[58] Field of Search ............... 426/595, 466, 388

[56] References Cited

U.S. PATENT DOCUMENTS

| | | | |
|---|---|---|---|
| 3,589,912 | 6/1971 | Adler et al. | 99/68 |
| 3,634,094 | 1/1972 | Ponzoni et al. | 99/68 |
| 3,700,462 | 10/1972 | Stefanucci et al. | 99/68 |
| 4,540,591 | 9/1985 | Dar et al. | 426/388 |
| 5,160,757 | 11/1992 | Kirkpatrick et al. | 426/466 |

FOREIGN PATENT DOCUMENTS

0405649A2 1/1991 European Pat. Off. .

*Primary Examiner*—Joseph Golian
*Attorney, Agent, or Firm*—William J. Winter

[57] ABSTRACT

Green coffee beans are dried prior to roasting to a moisture content of from 0.5 to 7%. The drying is conducted at from 70° to 325° F. (21° to 163° C.) for from 1 minute to 24 hours. The dried green beans are fast roasted to a Hunter L-color of from 10-16. The dried roasted beans are blended with non-dried coffee beans roasted to a Hunter L-color of from 17-24 and having a moisture content before roasting of greater than about 7%. The blend contains from 1-50% of the dried dark roasted beans and from 50-99% of the non-dried roasted beans. The blend has a surprisingly high yield.

18 Claims, 5 Drawing Sheets

HIGH-YIELD ROASTED COFFEE WITH BALANCED FLAVOR

This is a continuation of copending application Ser. No. 07/943,079, filed on Sep. 10, 1992 and now abandoned.

FIELD OF THE INVENTION

The present invention relates to high yield roasted coffee with balanced flavor and a process for making it.

BACKGROUND OF THE INVENTION

Numerous attempts have been made in the past to make roasted coffee which has both an enhanced brew coffee yield (volume of coffee brew per weight of roasted coffee) and an acceptable brewed flavor.

It is known that the extractability of roasted coffee (the amount of brew solids which can be extracted from a given weight of coffee from which a coffee brew is made) can be increased by grinding the roasted coffee to finer particles sizes. These fine grinds, however, are physically difficult to brew. The fine particles are subject to pooling, channeling and compaction during brewing. Fine grinds also have an undesirable balance of flavor and strength.

It is also known that extractability can be enhanced by flaking roast and ground coffee. Flaking involves roll milling a roast and ground coffee. More coffee can be brewed from flaked coffee due to the increased extractability. However, flaked coffee has lower levels of container aroma. It also lacks a desirable balance of flavor and strength.

It is known that fast roasting of coffee beans can also increase brew coffee yields. Roasting times affect product density and extractability. Fast roasted coffee, i.e., roast times less than about 5.5 minutes, is less dense than longer roasted coffee. Fast roasted coffee also provides an enhanced extractability. Fast roasted coffee, however, can also lack a desirable balance of flavor and strength.

It can be seen that enhacing extractability and brew coffee yield can be achieved but often at the expense of balanced flavor of the coffee brew.

There is therefore a need to provide a roasted coffee that has both an enhanced brew coffee yield (referred to herein as high-yield) and a balanced flavor.

SUMMARY OF THE INVENTION

The invention is a high-yield roasted coffee with balanced flavor and a process for making it. Green coffee beans are dried prior to roasting to a moisture content of from about 0.5 to about 7%. The drying is conducted at temperatures of from about 70° to about 325° F. (about 21° to about 163° C.) for from about 1 minute to about 24 hours. The dried coffee beans are fast roasted to an extreme Hunter L-color of from about 10 to about 16. The dried dark roasted coffee beans are blended with non-dried roasted coffee beans having a moisture content before roasting of greater than about 7%. The blend comprises from about 1 about 50% of the dried dark roasted beans and from about 50 to about 99% of the non-dried roasted beans.

The dried dark roasted beans provide strength with minimal burnt-rubbery flavor notes. The non-dried beans provide flavor and acidity. The resulting blend has a desirable balance of strength, flavor and acidity in a high-yield roasted coffee.

DETAILED DESCRIPTION OF THE INVENTION

The process of the invention involves three key steps. A first step involves drying green coffee beans. A second step involves fast roasting the dried beans to an extremely dark roast. A third step involves blending the dried dark roasted beans with roasted non-dried coffee beans.

The product of the invention, made by the process herein, contains a unique and critical balance of strength and good flavor compounds and acidity.

As used herein, all percentages and ratios are based on weight unless stated otherwise.

A) Drying Green Coffee Prior to Roasting

In the drying step, green coffee beans having an initial moisture content greater than about 10%, preferably from about 10 to about 14%, are dried prior to roasting. The dried beans have a moisture content of less than about 7%, preferably from about 3 to about 7%.

The drying should be conducted under gentle conditions. Large heat inputs and temperature differentails can result in tipping, burning or premature roast-related reactions of the coffee beans. The green beans are dried in an apparatus containing from 0 to 70% moisture. Drying temperatures are from about 70° to about 325° F. (about 21° to about 163° C.), preferably from about 160° to about 250° F. (about 71° to about 121° C.). Drying times are from about 1 minute to about 24 hours, preferably from about 2 to about 6 hours.

The drying step results in partially dehydrated coffee beans without causing significant roasting-related reactions to take place. Roasting reactions are described in Sivetz et al., "*Coffee Technology*", AVI Publishing Company, Westport, Conn., pp. 250–262 (1979), incorporated herein by reference.

Drying methods and apparatuses for use in the drying step are disclosed in U.S. Pat. No. 5,160,757 to Kirk Patrick et al which is incorporated herein by reference.

After the coffee beans are dried, they are subjected to a roasting step described hereinafter. The coffee beans should have minimal contact, preferably no contact, with moisture between the drying and roasting steps.

B) Dark Roasting Dried Coffee Beans

In the roasting step, the dried coffee beans are dark roasted to a Hunter L-color of from about 10 to about 16, preferably from about 12 to about 16, most preferably from about 14 to about 16. The dried dark roasted beans have tamped densities of from about 0.28 to about 0.42 grams/cc.

Conventional fast roasting methods are used. Roasting temperatures are from about 350° to about 1200° F. (about 177° to about 649° C.), preferably from about 400° to about 800° F. (about 204° to about 427° C.). Roast times are from about 10 seconds to about 5.5 minutes, preferably from about 1 to about 3 minutes. Fast roasting is described in U.S. Pat. No. 5,160,757 to Kirkpatrick et al. Fast roasting is also described in Sivetz, Coffee Technology, AVI Publishing Company, Westport, Conn., pp. 226-246 (1979), which is incorporated herein by reference.

At the desired Hunter L-color, the dark roasted beans are removed from the roaster heat. The beans are promptly cooled by typically ambient air and/or a water spray. Cooling the beans stops roast-related pyrolysis reactions.

It has been found that roasting the dried beans to the extreme Hunter L-colors develops strength compounds with minimal development of burnt-rubbery flavor compounds. The specific compounds are defined hereinafter. Dark roasting non-dried coffee beans, especially low quality beans such as Robustas, to these extremes would result in excessive burnt-rubbery flavor notes.

C) Blending Dried and Non-Dried Coffee Beans

The dried dark roasted coffee beans are blended with non-dried roasted coffee beans. The dried beans provide strength with minimal burnt-rubbery flavor notes. The non-dried beans provide flavor and acidity. The blend comprises from about 1 to about 50%, preferably from about 1 to about 20%, most preferably from about 5 to about 15% of the dried beans and from about 50 to about 99%, preferably from about 80 to about 99%, most preferably from about 85 to about 95% of the non-dried beans.

The non-dried beans are derived from green coffee beans having a moisture content prior to roasting of above about 7%, preferably from about 10 to about 14%. These green beans are not subjected to the drying step prior to roasting. The non-dried green coffee beans are roasted, preferably fast roasted, to a Hunter L-color of from about 17 to about 24. The non-dried roasted beans have tamped densities of from about 0.28 to about 0.42 grams/cc.

Both the dried and non-dried beans can be derived from low, intermediate or high quality coffee beans, or mixtures thereof. Preferably the dried beans are derived from intermediate or low quality beans or mixtures thereof, more preferably from low quality coffee beans, most preferably from Robustas. The non-dried beans are preferably derived from intermediate or high quality beans or mixtures thereof.

As used herein, non-limiting examples of high quality coffee beans include "Milds" (high grade Arabicas) such as Colombians, Mexicans, and washed Milds such as strictly hard bean Costa Rica, Kenyas A and B, and strictly hard bean Guatemalans. As used herein, non-limiting examples of intermediate quality coffee beans include Brazilians and African naturals. As used herein, non-limiting examples of low quality coffee beans include Robustas, low grade Naturals, low grade Brazils, and low grade unwashed Arabicas.

It has been found that flavor strength in the coffee blends can be derived from relatively few coffee beans. In the blended coffee, the high-strength beans (dried dark roasted beans) preferably represent only from about 5 to about 15% of the blended beans. This small fraction of beans has a high f(1) value (ratio of strength compounds to burnt-rubbery compounds) and a low f(2) value (amount of good flavor compounds). These values are listed in Table 1 and described hereinafter.

Very small amounts of these dried dark roasted beans can now be added to weak but flavorful coffees (i.e., high quality coffee such as Colombian). The result is a flavorful, full-strength coffee unadulterated by excessive burnt-rubbery flavor notes.

D) Admixture of Flakes and Roast and Ground Coffee

Optionally, the blend of roasted dried and non-dried coffee beans are ground, normalized and milled to an average flake thickness of from about 102 to about 1016 um (about 0.004 to about 0.04 inches), preferably from about 102 to about 508 um (about 0.004 to about 0.002 inches), most preferably from about 102 to about 254 um (about 0.004 to about 0.01 inches). Flaked coffees are described in: U.S. Pat. Nos. 5,064,676; 4,331,696; 4,267,200; 4,110,485; 3,660,106; 3,652,293; and 3,615,667, all of which are incorporated herein by reference.

Additionally, the flaked blend can be admixed with roast and ground coffee. The admixture comprises from about 10 to about 50%, preferably from about 25 to about 50% of the flaked blend and from about 50 to about 90%, preferably from about 50 to about 75% of the roast and ground coffee. The roast and ground coffee comprises the non-dried roasted beans, the dried roasted beans, or mixtures thereof, preferably the non-dried roasted beans.

It was found that thin flaking the dried dark roasted coffee beans, or blends containing the dried beans, results in a surprisingly dark cup color. Flaking increases brew solids by about 20% but increases cup color by about 40%. Cup color is important to consumer perceptions. Although cup color per se does not contribute to coffee flavor or strength, brewed coffee with darker colors are perceived as having richer, stronger flavors.

E) Characteristics of the Coffee Product

The coffee product of the invention has a unique chemistry profile. The unique chemistry provides a balanced flavor and a surprisingly high yield.

1) Chemistry Profile

The chemistry profile of the coffee product is defined by $f(1)$, $f(2)$, and $f(3)$ values wherein $f(1)$ is greater than about 900, $f(2)$ is greater than about 1200 and $f(3)$ is greater than about 125. These values are determined as follows.

$f(1) = 10,000 \times$ [strength compounds]/[burnt-rubbery compounds]

$f(2) = 100 \times$ [ethyl guaiacol]

$f(3) = 100 \times$ [good flavor compounds]/[flavor strength compounds]

Strength
  compounds = [pyrazine + pyridine + pyrrole + guaiacol + ethyl guaiacol]

Burnt-rubbery
  compounds = [3-thiazole + 4-methylthiazole + peak 13 + peak 14 + peak 15 + tetrahydothiophene + peak 17 + 2-thiophenecarboxaldehyde + peak 19 + 3-acetylthiophene + 2-acetylthiophene + peak 22]

Good flavor
  compounds = [ethanal + propanal + 2-pentanone + 3-pentanone + 2,3-pentanedione].

Individual compounds are measured in terms of total GC counts. Methods for measuring GC counts for each of the three compound groups (strength, good flavor, burnt-rubbery) are described hereinafter. The unknown "peak" compounds are defined hereinafter.

The chemistry of the coffee product is unique when compared to conventional and/or dark roasted coffee. As shown in Table 1, only the coffee product of the invention has the critical combination of f(1), f(2) and f(3) values.

TABLE 1

| Function | Vacuum Folgers | Maxwell House Master Blend | Chock Full of Nuts Ultra-Roast | French Roast | Splendid Italian Expresso | Dried Roasted Coffee | Non-Dried Roasted Coffee | Blend of the Dried (10%) and Non-Dried (90%) Coffee |
|---|---|---|---|---|---|---|---|---|
| f(1) | 710 | 1000 | 870 | 940 | 1320 | 4300 | 700 | 1060 |
| f(2) | 770 | 835 | 1060 | 750 | 2140 | 7600 | 1000 | 1660 |
| f(3) | 310 | 150 | 210 | 220 | 50 | 95 | 200 | 190 |

The Table 1 coffees are defined as follows. Vacuum Folgers is a 13 ounce, automatic drip grind (ADC) coffee manufactured by The Procter & Gamble Company, code date 2133N. Maxwell House Master Blend is an 11.5 ounce, ADC coffee manufactured by General Foods, code date 2054. Folgers French Roast is a 12 ounce, dark roast, ADC coffee made by The Procter & Gamble Company, code date 2106. Chock Full of Nuts Ultra Roast is an FAC (for all coffeemakers) coffee manufactured by Chock Full of Nuts Corp., code date 1N20. Splendid Italian Expresso is a 17.6 ounce, fine grind coffee manufactured by The Procter & Gamble Company, code date Mar90. The dried and non-dried coffees are the components of the 10:90 blend. The blend is a high-yield, balanced flavor coffee of the invention.

2) Balanced Flavor Benefit

The chemistry profile of the coffee product provides a balanced flavor to coffee brews. Other coffee products have from zero to two of the f(1), f(2) or f(3) values in the ranges recited herein. However, it is the combination of all three values at the recited levels that is critical.

f(1) relates flavor strength to burnt-rubbery flavor. It is desirable to achieve a high f(1) value especially in high-yield coffee (i.e., low density, fast roasted coffee). High-yield coffees often have increased flavor strength and increased burnt-rubbery flavor. The coffee product of this invention has increased flavor strength but only minimal increased burnt-rubbery flavors. The dried dark roasted beans provide this benefit to the coffee product.

f(2) relates to ethyl guaiacol levels. Ethyl guaiacol provides flavor strength. The high f(2) value indicates a selectively developed strength component from the dried roasted coffee beans.

f(3) relates good flavor to flavor strength. It is desirable to increase f(3) to develop a balance of good flavor with increased flavor strength. The good flavor arises from the non-dried roasted coffee beans. The flavor strength arises from the dried dark roasted coffee beans.

3) High Yield Benefit

It was found that the coffee product of the invention has a surprisingly high yield. As used herein, "yield" means the weight in grams of a roasted coffee needed to brew one cup of coffee. Yields for various coffees are listed in Table 2.

TABLE 2

| Coffee type (weight per 1000 cc volume of roasted coffee) | Weight of roasted coffee needed to make one cup of brewed coffee (grams/cup) |
|---|---|
| Conventional roast and ground coffees: | |
| 16 ounce coffee | 5.16 |
| 13-ounce coffee* | 4.20 |
| 11.5-ounce coffee* | 3.71 |
| 10.5-ounce coffee* | 3.39 |
| High-yield coffee of the invention: | |
| (13-ounce)* | 2.58 |

*fast roasted, low density coffee

The roasted coffee product of the invention yields from about 30 to about 100% more brewed coffee. It also yields from about 30 to about 63% more brewed coffee than other low density, fast roasted coffee. The phrase "cup of brewed coffee" in Table 2 means coffee brews that are organoleptically similar to or better than that of conventionally brewed roast and ground coffee.

This high-yield coffee can be combined with soluble coffees or admixed with non-coffee materials. It can be caffeinated or decaffinated. It can also be added to filter packs or used to manufacture soluble coffee.

4) Acidity

Brewed coffee from the coffee product has a brewed acidity index of above about 2200. The brewed acidity index described hereinafter is the expression of coffee acidity used herein. Brewed coffee with a brewed acidity index of less than about 2200 lacks the acidity which is necessary for acceptable coffee flavor.

ANALYTICAL METHODS

A) Analysis of Strength Compounds including Ethyl Guaiacol

1) Analytical Method

The simultaneous steam distillation and extraction (SDE) method disclosed by Schultz et al., J. Agric. Food Chem. 25, 446–449 (1977), followed by capillary gas chromatography (CGC) of an SDE extract, is used to analyze the flavor strength compounds including ethyl guaiacol. The combined SDE-CGC method is disclosed in U.S. Pat. No. 4,857,351 to Neilson et al., issued Aug. 15, 1989, which is incorporated herein by reference.

An SDE extract (0.3 ml) is obtained from a roast and ground coffee by the SDE method described in U.S. Pat. No. 4,857,351. The extract is analyzed with a Hewlett-Packard 5880A Capillary Gas Chromatograph (HP-CGC). The HP-CGC has a fused silica column (DB5 column, 60 meter length, 0.32 mm internal column diameter, from J&W Scientific, Inc. of Cardova, Calif.) and a flame ionization detector (FID) to detect the carbon and hydrogen of the volatile compounds in the SDE extract. The column contains a film of crosslinked polyethylene glycols 1.0 um thick. A Hewlett-Packard Level Four data terminal is used to process the data for retention times, peak areas and area percents.

2) Application of the Analytical Method

Roast and ground coffee (5.0 grams) is placed in a 500 cc round bottom flask. Distilled water (200 grams) is added to the flask. Internal standard (3 ml) and boiling stones are added to the flask. The preferred internal standard is isoamyl acetate (5 mcl) dissolved in methylene chloride to make 100 ml. Contents of the flask are then processed into an SDE extract. The extract (3 mcl) is injected on to the column. The GC oven is maintained at 25° C. (77° F.) for 2.6 minutes. The oven temperature is raised 20° C./min. to 45° C. (113° F.) and then held for 7 minutes, raised again at 3.0° C./min. to 65° C. (149° F.) and then held for 6 minutes, raised again at 2.0° C./min. to 125° C. (257° F.) and held for 1 minute, raised again at 3.0° C./min. to 220° C. (428° F.) and held for 6 minutes, and finally raised to 230° C. (446° F.) and held for 30 minutes.

| Conditions for the HP-CGC: | |
|---|---|
| Septum purge flow | 1 cc/min. |
| Inlet pressure | 26 psig |
| Vent flow | 30 cc/min. |
| Make-up carrier flow | 30 cc/min. |
| Flame Ionization Detector: | |
| Hydrogen flow rate | 30 cc/min. |
| Air flow rate | 400 cc/min. |
| Column flow | 3 cc/min. |
| Split ratio | 10/1 |

Figure 1:
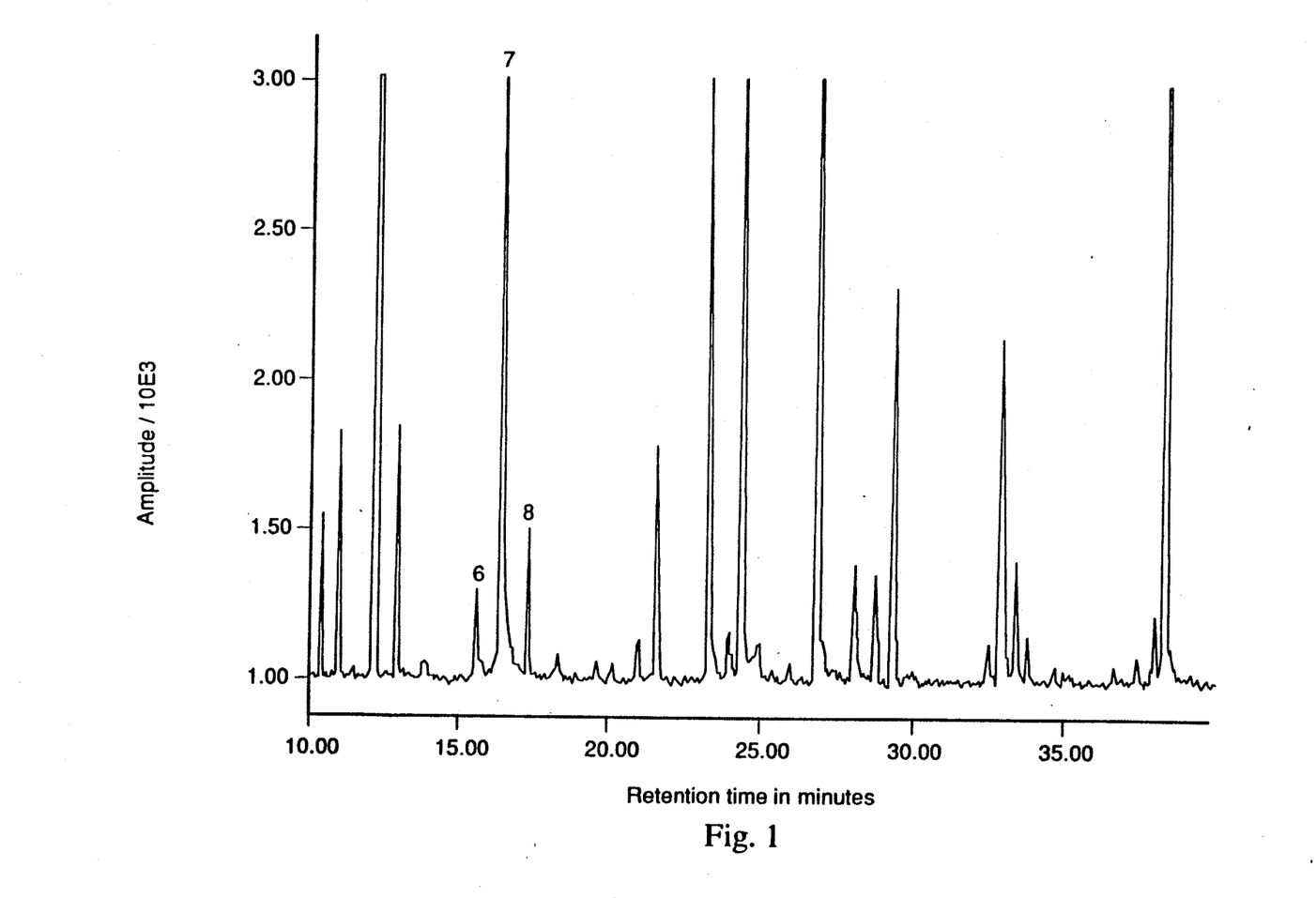
FIGS. 1 and 2 illustrate gas chromatograms for strength compounds including ethyl quaiacol.
Figure 2:
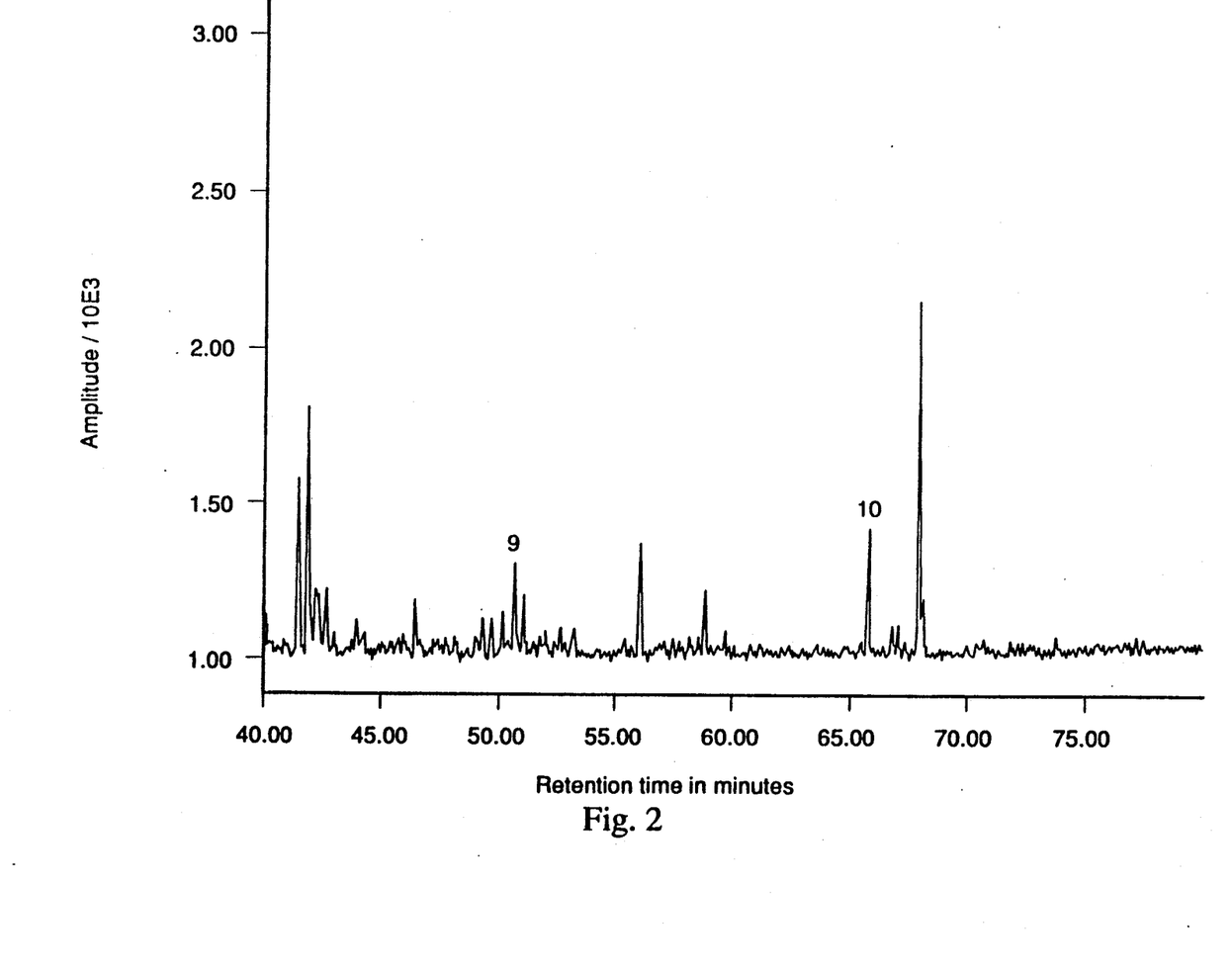

FIGS. 1 and 2 are gas chromatograms from the SDE-CGC analytical method using SDE extract obtained from the roasted coffee of the present invention. Peaks are labeled 6 to 10 which correspond to pyrazines (6), pyridines (7), pyrroles (8), guaiacols (9), and ethyl guaiacols (10).

The chromatogram is analyzed by determining the area of each recorded peak. The peaks are proportional to the GC counts (digitized electrical impulses proportional to GC peak areas).

Total GC counts as used herein are corrected GC counts. GC counts of each peak of a sample extract are normalized (corrected) to make all of the sample extracts on the same basis for comparison by ratioing the GC counts of each peak to the GC counts of the internal standard.

Corrected GC counts for a given compound are calculated using the following equation:

$$\text{Corrected } GC \text{ Counts} = \frac{\text{Area of a } GC \text{ Peak}}{\text{Area of the Internal Standard Peak}} \times \text{Response Factor} \times \text{Dilution Factor}$$

Response factors for specific compounds include pyrazine (1.200), pyridine (0.660), pyrrole (0.950), guaiacol (0.740) and ethyl guaiacol (1.000).

B) Analysis of Burnt-rubbery Compounds

This method is used to analyze burnt-rubbery compounds. It is similar to that used in analyzing the flavor strength compounds. Differences in the two methods are described below.

The SDE extract is analyzed by a HP-CGC and a Supelcowax-10 fused silica column (Supelo, Inc. of Bellefontaine, Pa.). The column is used with a flame photometric detector (FPD) to detect volatile sulfur compounds (i.e., burnt-rubbery compounds) in the SDE extract.

In making the SDE extract, the preferred internal standard is 2,5-dimethyl thiophene dissolved in methylene chloride (10 mcl diluted to 25 ml in a first dilution, then 6 ml diluted to 200 ml in a second dilution).

The SDE extract is injected on to the column. The GC oven is maintained at 50° C. for 3.00 minutes. The oven temperature is raised 2.0° C./min. to 100° C. and then held for 15 minutes, raised again at 1.00° C./min. to 130° C. and then held for 1 minute, and then raised to 201° C. and held for 5 minutes.

Figure 3:
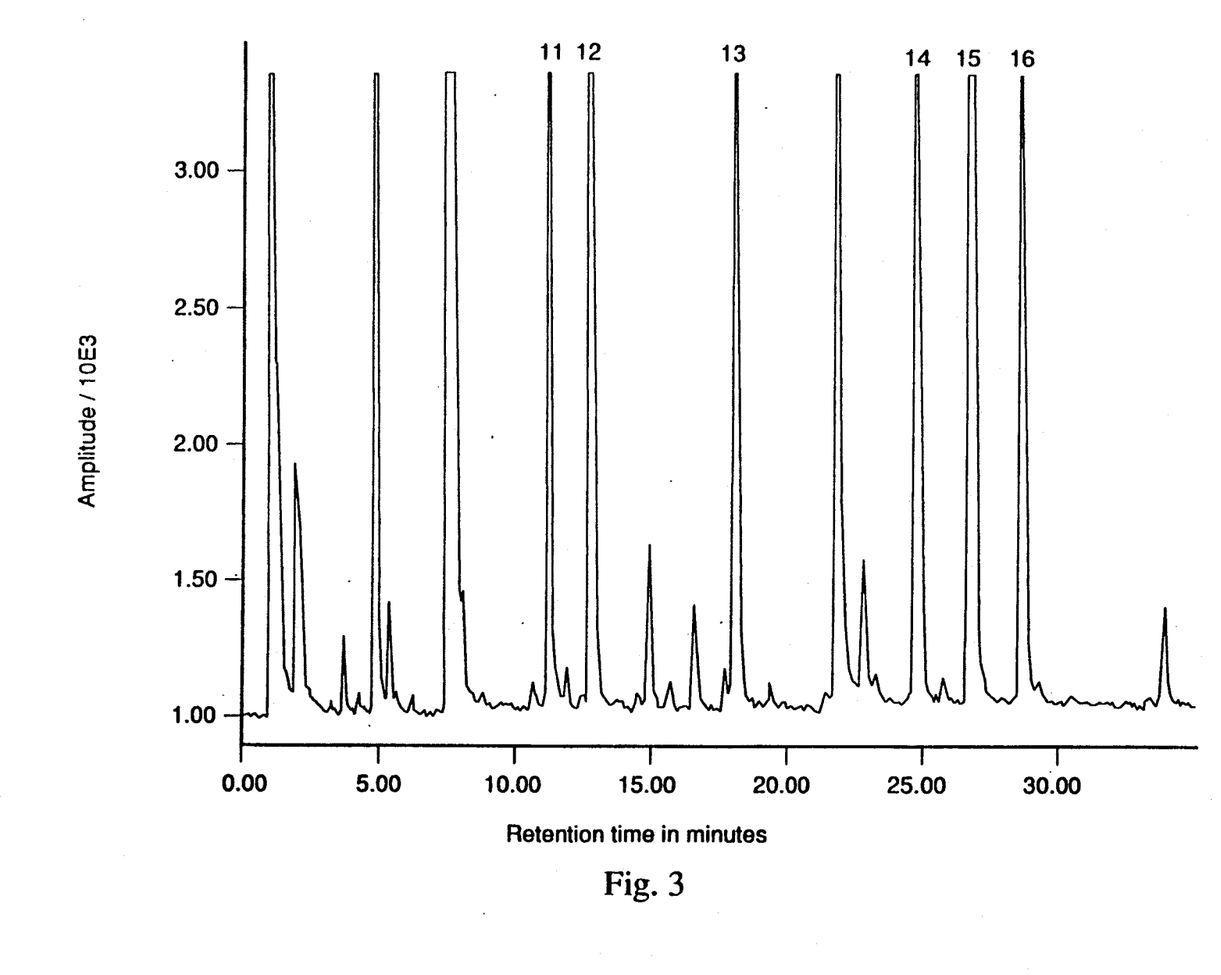
FIGS. 3 and 4 illustrate gas chromatograms for burnt-rubbery compounds.
Figure 4:
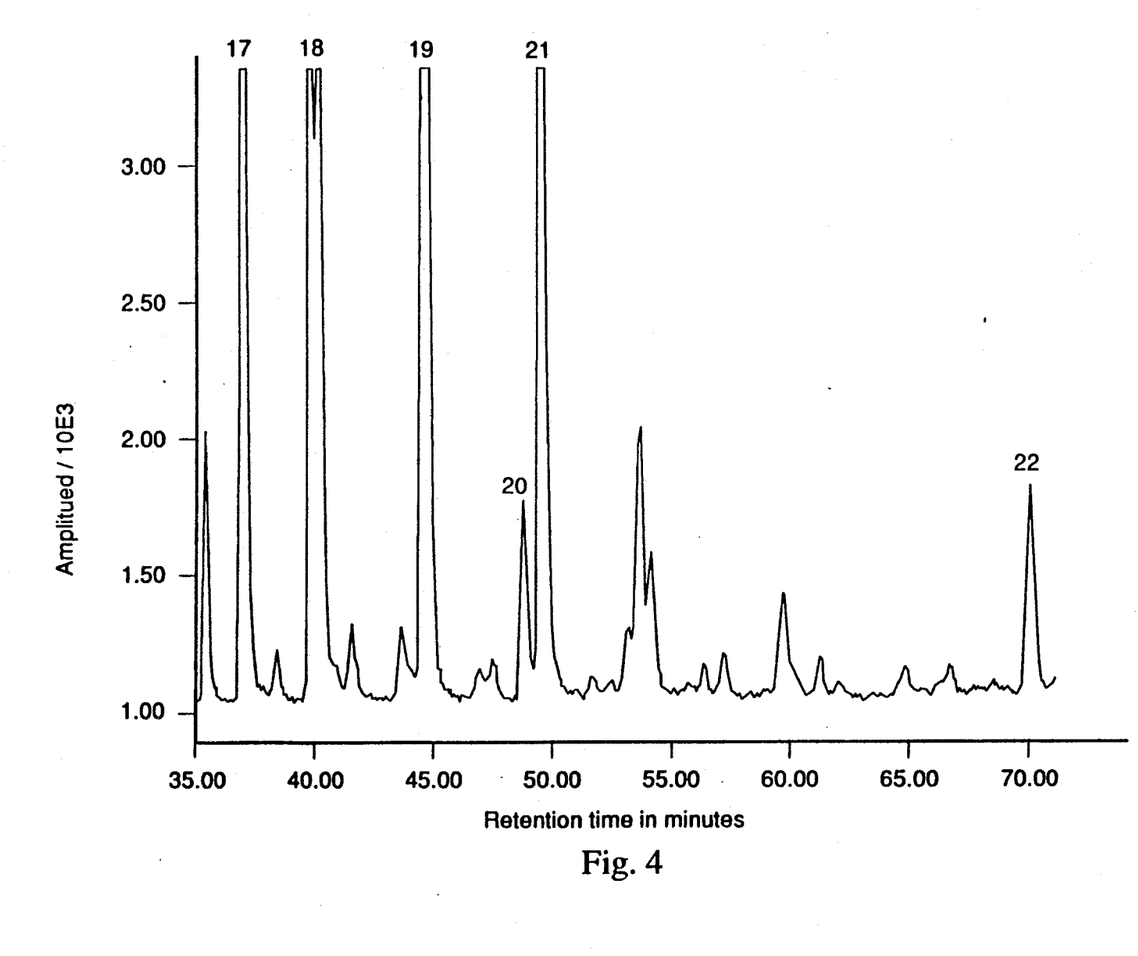

FIGS. 3 and 4 are gas chromatograms from this method using SDE extract obtained from the roasted coffee of the present invention. The peaks are labeled 11 to 22 which correspond to 3-thiazole (11), 4-methylthiazole (12), peak 13 (13), peak 14 (14), peak 15 (15), tetrahydrothiophene (16), peak 17 (17), 2-thiophenecarboxaldehyde (18), peak 19 (19), 3-acetylthiophene, 2-acetylthiophene and peak 22.

The response factor is 1 for each of the burnt-rubbery compounds.

C) Analysis of Good Flavor Compounds

1) Analytical Method

Programmed temperature GC analysis is used to analyze the good flavor compounds. Sodium sulfate and an internal standard are added to a brewed coffee inside a closed system and heated. A headspace sample from the heated combination is injected into a Varian model 3400 Gas Chromatograph (DB-1701 column, 30 meter length, 0.32 mm internal column diameter, from J&W Scientific of Folsom, Calif.). The column contains a film of crosslinked polyethylene glycols 1.0 μm thick.

2) Application of Analytical Method

Sodium sulfate (13.00±0.03 grams) is placed in a 120 cc septum bottle. A roast and ground coffee sample (13.00±0.01 grams) is added to the bottle followed by de-ionized water (65 ml) and internal standard (1 ml).

The internal standard is made by the following operation. A 1000 cc volumetric flask is filled with distilled water to within 5–10 cm of the 1000 cc calibration mark. With a pipet, 1 ml of regent grade ethyl acetate is added to the flask. The ethyl acetate should be dispensed into the flask by lowering the tip of the pipet just below the surface of the water and tipping the flask (and pipet) slightly so that when the ethyl acetate is released, the droplets will rise to the surface free of the pipet. When the ethyl acetate has stopped flowing, the pipet is raised inside the flask neck and the final few drops are "tipped off." The flask is stoppered, inverted, and agitated by swirling and inverting it 5–10 times. Agitation is stopped and the air bubbles are allowed to rise. Distilled water is added to make 1000 ml. The liquid is again agitated. The resulting internal standard within the flask contains 1000 ppm (v/v) ethyl acetate.

After adding the internal standard, the bottle is sealed with a septum. A 2 cc gas syringe and the sealed bottle are placed into a Blue M oven (Model SW-11TA) for 45 minutes at 90° C. The bottle is removed from the oven. A needle attached to the heated syringe is inserted through the septum to a level halfway between the top of the bottle and the surface of the liquid therein. Headspace (2 ml) is removed and injected into the gas chromatograph.

The initial temperature of the column oven is 100° C. for 5 minutes, raised 4° C./minute to 115° C. and then held for 7 minutes, and finally raised 7° C./min. to 200° C. and then held for 2 minutes.

GC conditions are:
Carrier gas: helium—2.5 cc/min.
Injection port temperature: 646° F. (240° C.)
Flame ionization detector:
 Temperature: 482° F. (250° C.)
 Hydrogen flow rate: 30 cc/min.
 Air flow rate: 300 cc/min.
Chart speed: 0.5 cm./min.

The chromatogram analysis is the same as that used in the analysis of flavor strength and good flavor compounds.

Figure 5:
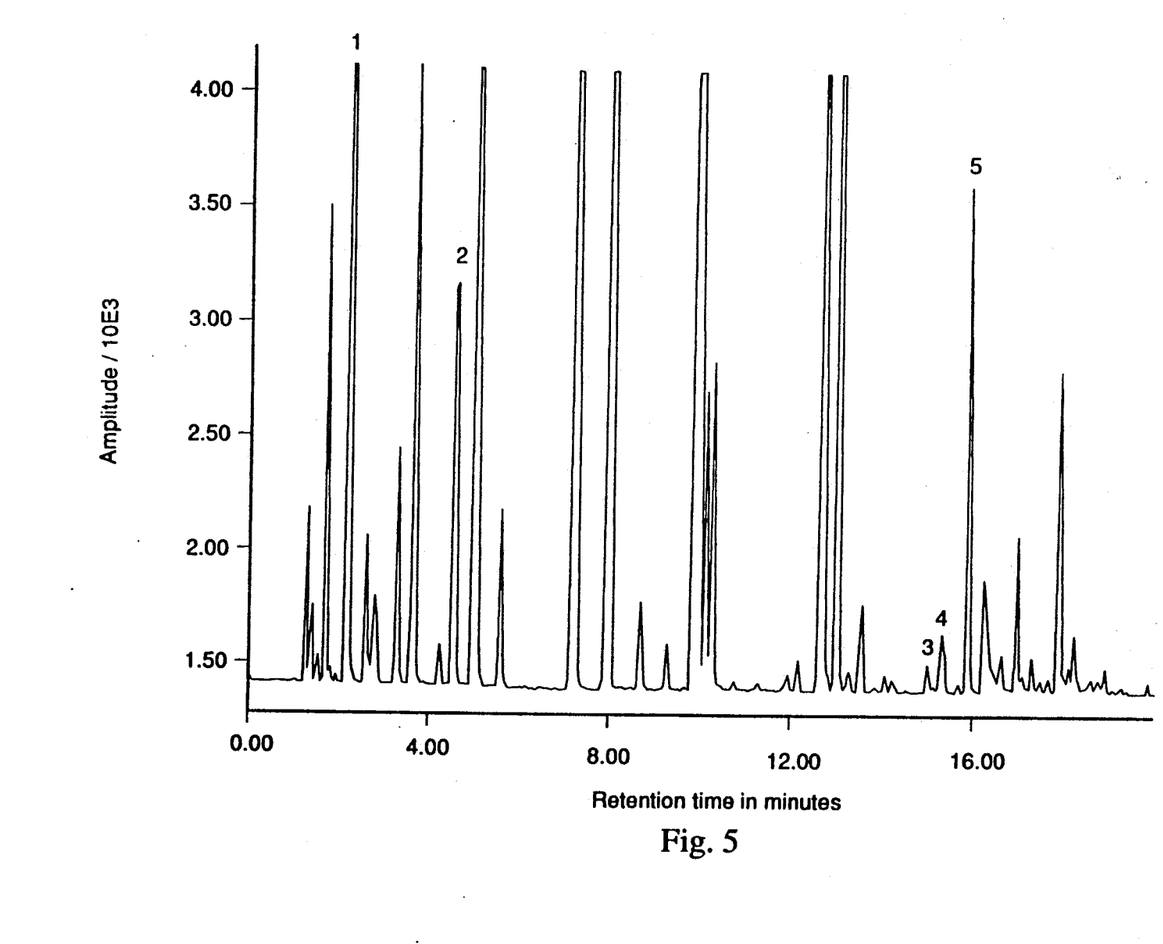
FIG. 5 illustrates a gas chromatogram for good flavor compounds. Analytical methods used to generate the chromatograms are described hereinafter.

FIG. 5 is a gas chromatogram of this method using extract derived from roasted coffee from the present invention. The peaks are labeled 1 to 6 which correspond to ethanal (1), propanal (2), 2-pentanone (3), 3-pentanone (4) and 2,3-pentanedione (5).

In calculating corrected GC counts, the response factors include ethanal (71.59801), propanal (29.16200), 2-pentanone (18.42800), 3-pentanone (15.77300) and 2,3-pentanedione (41.89000).

C) Measuring Acidity

Brewed acidity index relates to the acidity of brewed coffee. Brewed coffee typically has a pH of from about 4 to 5. The brewed acidity index is a more discriminating acidity scale than logarithmic based pH units.

The brewed acidity index = 1000 × volume (ml) of 0.1 Normal sodium hydroxide added to 150 grams of coffee brew to raise its pH to 7.00. The coffee brew is prepared from 31.2 grams of roasted coffee particles and 1420 ml of distilled water in a conventional automatic drip coffeemaker.

EXAMPLES

Preparation and characteristics of the high-yield, balanced-flavor coffee is illustrated by the following examples.

Example 1

Batch A (dark roasted dried beans): 100% green robusta coffee beans with an 11% moisture content are dried at 170° F. (77° C.) for 6 hours to a 5% moisture content. The dried beans are fast roasted in a Thermalo roaster, Model Number 23R using 45 kg (100 lb) batches. The gas burner input rate is 1.7 million Btu/hr (498 kW). The roasting time is 130 seconds. The roasted beans have a Hunter L-color of 15 and a tamped density of 0.31 grams/cc.

Batch B (roasted non-dried beans): A blend of green coffee beans (50% washed Arabica, 50% natural Arabicas) with an 11% moisture content are fast roasted in a Thermalo roaster using 45 kg (100 lb) batches. The gas burner input rate is 1.4 million Btu/hr (410 kW). Roasting time is 165 seconds. The roasted beans have a Hunter L-color of 18 and a tamped density of 0.36 grams/cc.

A 20:80 blend (Batch A to Batch B) is cracked, normalized, ground and flaked to an average flake thickness of 127 um (0.005 inches). Roasted beans from Batch B are ground to an average particle size of about 1000 um. The ground coffee is admixed with the coffee flakes in a 1:1 weight ratio. The brewed acidity index is 2800. f(1) is 1046, f(2) is 2100 and f(3) is 149.

Example 2

Batch A (dark roasted dried beans): 100% green robusta coffee beans with an 11% moisture content are dried at 170° F. (77° C.) for 6 hours to a 5% moisture content. The dried beans are fast roasted in a Thermalo roaster using 45 kg (100 lb) batches. The gas burner input rate is 1.7 million Btu/hr (498 kW). The roasting time is 120 seconds. The roasted beans have a Hunter L-color of 17 and a tamped density of 0.31 grams/cc.

Batch B (roasted non-dried beans): A blend of green coffee beans (65% washed Arabica, 35% natural Arabicas) with an 11% moisture content are fast roasted in a Thermalo roaster using 45 kg (100 lb) batches. The gas burner input rate is 1.4 million Btu/hr (410 kW). Roasting time is 165 seconds. The roasted beans have a Hunter L-color of 18 and a tamped density of 0.36 grams/cc.

A 29:71 blend (Batch A to Batch B) is cracked, normalized, and ground to an average particle diameter of 500 um. The brewed acidity index is 2650. f(1) is 1139, f(2) is 1738 and f(3) is 211.

Example 3

Batch A (dark roasted dried beans): A blend of green coffee beans (50% washed Milds, 30% natural Arabicas, 20% Robustas) with an 11% moisture content are dried at 170° F. (77° C.) for 6 hours to a 5% moisture content. The dried beans are fast roasted in a Thermalo roaster using 45 kg (100 lb) batches. The gas burner input rate is 1.7 million Btu/hr (498 kW). The roasting time is 120 seconds. The roasted beans have a Hunter L-color of 17 and a tamped density of 0.31 grams/cc.

Batch B (roasted non-dried beans): A blend of green coffee beans (50% washed Milds, 30% natural Arabicas, 20% Robustas) with an 11% moisture content are fast roasted in a Thermalo roaster using 45 kg (100 lb) batches. The gas burner input rate is 1.4 million Btu/hr (410 kW). Roasting time is 165 seconds. The roasted beans have a Hunter L-color of 18 and a tamped density of 0.36 grams/cc.

A 5:95 blend (Batch A to Batch B) is ground to an average particle diameter of 900 um. About 25% of the ground coffee is flaked to an average flake thickness of 127 um (0.005 inches). The flakes are admixed with the remaining ground blended coffee. Tamped density is 0.37 grams/cc.

What is claimed is:

1. Process for making high-yield roasted coffee with balanced flavor which comprises:
 (a) drying green coffee beans prior to roasting to a moisture content of from about 0.5 to about 7% by weight, wherein the drying is conducted at a temperature of from about 21° to about 163° C. for from about 1 minute to about 24 hours;
 (b) roasting the dried beans from drying step (a) at a temperature of from about 177° to about 649° C. for from about 10 seconds to about 5.5 minutes to a Hunter L-color of from about 10 to about 16; and
 (c) blending the dried roasted beans from roasting step (b) with non-dried coffee beans roasted to a Hunter L-color of from about 17 to about 24 and having a moisture content before roasting of greater than about 7% by weight, wherein the blend comprises from about 1 to about 20% by weight of the dried roasted beans and from about 80 to about 99% by weight of the non-dried roasted beans; wherein the resulting roasted coffee blend has an improved brew yield of from about 30 to about 100%.

2. A process according to claim 1 wherein the dried roasted coffee beans from roasting step (b) have a Hunter L-color of from about 12 to about 16.

3. A process according to claim 1 wherein the blend of dried roasted coffee beans and non-dried roasted coffee beans from blending step (c) comprises from about 5 to about 15% by weight of the dried roasted coffee beans and from about 85 to about 95% by weight of the non-dried roasted coffee beans.

4. A process according to claim 1 wherein the dried green coffee beans in drying step (a) are selected from the group consisting of low quality coffee beans, intermediate quality coffee beans and mixtures thereof, and the non-dried coffee beans in blending step (c) are selected from the group consisting of intermediate quality coffee beans, high quality coffee beans and mixtures thereof.

5. A process according to claim 1 wherein the dried green coffee beans in drying step (a) are Robustas.

6. A process according to claim 1 wherein the dried green coffee beans in roasting step (b) are roasted at a temperature of from about 204° to about 427° C. for from about 1 to about 3 minutes.

7. A process according to claim 1 wherein the drying in drying step (a) is conducted at a temperature of from about 71° to about 121° C. for from about 1 to about 6 hours.

8. A process according to claim 1 wherein the green coffee beans are dried in drying step (a) to a moisture content of from about 3 to about 7% by weight.

9. A process according to claim 1 further comprising the steps of:

(a) flaking the blend of dried roasted and non-dried roasted coffee beans in blending step (c) to an average flake thickness of from about 102 to about 1016 um;

(b) blending the flaked coffee with roast and ground coffee, wherein the the blend of flaked coffee and roast and ground coffee comprises from about 10 to about 50% by weight flaked coffee and from about 50 to about 90% by weight roast and ground coffee.

10. A process according to claim 9 wherein the flaked coffee has an average flake thickness of from about 102 to about 254 um and the blend of flaked coffee and roast and ground coffee comprises from about 25 to about 50% by weight flaked coffee and from about 50 to about 75% by weight roast and ground coffee.

11. A roasted coffee product comprising:

(a) from about 1 to about 20% dark roasted coffee made by the process comprising (i) drying green coffee beans prior to roasting to a moisture content of from about 0.5 to about 7% by weight, wherein the drying is conducted at a temperature of from about 21° to about 163° C. for from about 1 minute to about 24 hours:

(ii) roasting the dried beans from step (a)(i) at a temperature of from about 177° to about 649° C. for from about 10 seconds to about 5.5 minutes to a Hunter L-color of from about 10 to about 16;

(b) from about 80 to about 99% coffee roasted to a Hunter L-color of from about 17 to about 24 and derived from green coffee beans having a moisture content prior to roasting of greater than about 7%;

(c) wherein the roasted coffee product has an f(1) value greater than about 900, an f(2) value greater than about 1200, and an f(3) value greater than about 125, where $$f(1) = 10,000 \times [\text{pyrazine} + \text{pyridine} + \text{pyrrole} + \text{guaiacol} + \text{ethyl guaiacol}]/[\text{3-thiazole} + \text{4-methylthiazole} + \text{peak 13} + \text{peak 14} + \text{peak 15} + \text{tetrahydothiophene} + \text{peak 17} + \text{2-thiophenecarboxaldehyde} + \text{peak 19} + \text{3-acetylthiophene} + \text{2-acetylthiophene} + \text{peak 22}],$$

$$f(2) = 100 \times [\text{ethyl guaiacol}], \text{ and}$$

$$f(3) = 100 \times [\text{ethanal} + \text{propanal} + \text{2-pentanone} + \text{3-pentanone} + \text{2,3-pentanedione}]/[\text{pyrazine} + \text{pyridine} + \text{pyrrole} + \text{guaiacol} + \text{ethyl guaiacol}];$$

(d) wherein the brewed acidity index is greater than about 2200, where brewed acidity index = 1000 × volume (ml) of 0.1 Normal sodium hydroxide added to 150 grams of coffee brew to adjust the pH of the brew to 7.00, and (e) wherein the roasted coffee product has an improved brew yield of from about 30 to about 100%.

12. A coffee product according to claim 11 wherein the dried dark roasted coffee from (a) have a Hunter L-color of from about 12 to about 16.

13. A coffee product according to claim 11 wherein the coffee product comprises from about 5 to about 15% by weight of the dried roasted coffee from (a) and from about 85 to about 95% by weight of the non-dried roasted coffee from (b).

14. A coffee product according to claim 11 wherein the dried dark roasted coffee from (a) is derived from coffee beans selected from the group consisting of low quality coffee beans, intermediate quality coffee beans, and mixtures thereof, and the non-dried coffee from (b) is derived from coffee beans selected from the group consisting of high quality coffee, intermediate quality coffee, and mixtures thereof.

15. A coffee product according to claim 11 wherein the dark roasted coffee from (a) is derived from Robusta beans.

16. A coffee product according to claim 11 wherein the roasting in step (a)(ii) is conducted at a temperature of from about 204° to about 427° C. for from about 1 to about 3 minutes.

17. A coffee product according to claim 11 wherein the drying in step (a)(ii) is conducted at a temperature of from about 71° to about 121° C. for from about 1 to about 6 hours.

18. A coffee product according to claim 11 wherein the green coffee beans are dried in step (a)(ii) to a moisture content of from about 3 to about 7% by weight.

* * * * *